United States Patent [19]

Olney et al.

[11] Patent Number: 5,413,159
[45] Date of Patent: May 9, 1995

[54] SELF-REGULATING TIRE PRESSURE SYSTEM AND METHOD

[75] Inventors: Ross D. Olney, West Hills; John W. Reeds, Thousand Oaks, both of Calif.

[73] Assignee: Hughes Aircraft Company, Los Angeles, Calif.

[21] Appl. No.: 149,269

[22] Filed: Nov. 9, 1993

Related U.S. Application Data

[62] Division of Ser. No. 793,762, Nov. 18, 1991, Pat. No. 5,293,919.

[51] Int. Cl.⁶ .................... B60C 23/16; B60C 23/04
[52] U.S. Cl. .............................. 152/418; 340/442; 340/445; 340/448; 73/146.5
[58] Field of Search ............... 152/415, 416, 417, 418; 340/442, 445, 448; 73/146.5; 200/61.22, 61.25

[56] References Cited

U.S. PATENT DOCUMENTS

| | | | |
|---|---|---|---|
| 2,213,539 | 9/1940 | Wiegand | 152/416 |
| 2,391,652 | 12/1945 | Stevenson | 152/421 |
| 2,510,052 | 6/1950 | Navarro et al. | 137/225 |
| 2,550,986 | 5/1951 | Flanery et al. | 200/61.26 |
| 2,939,504 | 6/1960 | Bedford, Jr. | 152/418 |
| 3,249,916 | 5/1966 | Quinn et al. | 29/709 |
| 3,602,884 | 8/1971 | Brumbelow | 340/448 |
| 3,614,732 | 10/1971 | Clemont-Ferrand | 340/448 |
| 3,662,335 | 5/1972 | Fritze | 340/448 |
| 3,665,387 | 5/1972 | Enbrit | 340/448 |
| 3,723,966 | 3/1973 | Mueller et al. | 340/447 |
| 3,963,887 | 6/1976 | Takusagawa et al. | 200/61.25 X |
| 4,067,376 | 1/1978 | Barabino | 152/418 |
| 4,082,960 | 4/1978 | Denamps et al. | 340/448 |
| 4,742,857 | 5/1988 | Gandhi | 152/418 |
| 4,938,272 | 7/1990 | Sandy et al. | 152/427 |

FOREIGN PATENT DOCUMENTS

| | | |
|---|---|---|
| 0305312 | 3/1989 | European Pat. Off. |
| 3209660 | 10/1983 | Germany |

OTHER PUBLICATIONS

Research Disclosure No. 33517, "Low Tire Pressure Signal Apparatus", Mar. 1992.

Communication dated Jun. 3, 1991 from Frank Wiloch (GM Advanced Engineering Staff) to R. D. Olney (one of inventors of the present invention) relating to a Low Tire Pressure Monitor.

EPIC Technologies, Inc. brochure, "Technical Description EPIC Low Tire Warning System", published at least as early as Jul., 1990.

*Primary Examiner*—Michael W. Ball
*Assistant Examiner*—Francis J. Lorin
*Attorney, Agent, or Firm*—V. D. Duraiswamy; W. K. Denson-Low

[57] ABSTRACT

A self-regulating tire pressure system and method employs a bistable valve (10) that allows air from a high pressure reservoir (6) to replenish the pressure within a tire (4) when it has fallen below an actuating pressure, and discontinues its operation only after the tire pressure has increased to a closing pressure that is greater than the actuating pressure. The system is capable of sensing the valve's (10) frequency of operation as an indication of a slow tire leak when the frequency exceeds a predetermined threshold, of sensing the number of valve (10) operations and the duration of each operation as an indication of a flat tire condition when the number of operations for a predetermined duration exceeds a second threshold, and of sensing the duration of the valve's (10) operation as an indication of a low reservoir (6) pressure condition when that duration exceeds a third threshold. The valve (10) includes a bistable diaphragm (94, 120) that receives a reference pressure on one side and the tire pressure on its opposite side, and snaps between two stable positions respectively opening and closing the valve (10) in response to the tire pressure falling below the actuating pressure and then increasing to the closing pressure.

14 Claims, 7 Drawing Sheets

SELF-REGULATING TIRE PRESSURE SYSTEM AND METHOD

This is a division of application Ser. No. 07/793,762 filed Nov. 18, 1991, now U.S. Pat. No. 5,293,919.

BACKGROUND OF THE INVENTION

1. Field of the Invention

This invention relates to self-regulating pressure systems and methods for vehicle tires, and more particularly to self-regulating systems and methods in which the tire is automatically replenished from a high pressure reservoir in response to a sensed low pressure condition in the tire.

2. Description of the Related Art

Low tire pressure is an important cause of excessive fuel consumption, tire wear and impaired steerability. A normal tire will typically leak on the order of 25 percent of its pressure per year due to its inherent permeability. It is thus good practice to check tire pressure on a regular basis. However, even checking tire pressure every few weeks may not prevent these adverse effects when a slow leak is present, and the leak may go undetected unless a careful record is maintained of how frequently the pressure in each tire has to be replenished. A fast leak or flat condition can rapidly cause damage to the tire and even render it unusable in a short period of time, but this condition may go unnoticed by an inexperienced driver until it is too late.

It is thus highly desirable to have some mechanism that automatically replenishes the tire pressure when it is too low, and that warns the driver of the low pressure condition. One such system is disclosed in U.S. Pat. No. 4,067,376 to Barabino. This patent incorporates a high pressure reservoir into the vehicle wheel, and uses a valve that automatically opens a passageway between the high pressure reservoir and the tire in response to the tire pressure falling below a selected threshold level. Operation of the valve also causes a sonic or ultrasonic signal to be generated which is detected by a sensor mounted in close proximity to the wheel, typically within the wheel well. When it senses a valve operation, the sensor initiates a visual and audio warning for the driver. To differentiate between the different tires, the valve on each tire may be tuned to generate a signal with a unique frequency, or the sensors for the different tires may be tuned to detect different components of a uniform valve signal.

Another system is disclosed in U.S. Pat. No. 4,742,857 to Gandhi. In this patent the tire valve includes a magnet that moves in response to a falling tire pressure. Movement of the magnet to a low pressure position is sensed by a solenoid mounted on the shock absorber adjacent the tire. The magnetic field from the moveable magnet intercepts the solenoid at each tire revolution, generating a voltage in the solenoid that varies with the magnet's position. When the magnet's sensed position indicates a low pressure condition, a warning is provided to the vehicle operator. If the operator wishes to replenish the tire pressure, he or she actuates a switch that supplies current to the solenoid for the appropriate tire. The solenoid produces a magnetic field that moves its associated magnet to a position at which a valve from a high pressure reservoir within the wheel is opened so that air can flow into the tire.

While the above systems can effectively replenish the air pressure within a tire, they are incapable of distinguishing between normal long term leakage from a tire, a slow leak condition that requires repair, and a fast leak or flat tire condition. The vehicle operator is thus uninformed as to whether a tire repair or replacement is called for. The operator is also not supplied with any information as to the condition of the high pressure reservoir, and whether it requires replenishment. Furthermore, the prior use of separate transmitters within each wheel and associated receivers on the vehicle requires a power source within each wheel and complex electronics, and is unduly expensive.

An after market sensor for low tire pressure has been marketed by Epic Technologies Inc. The sensor monitors tire pressure and causes a radio frequency (RF) signal to be transmitted in case the pressure falls below a predetermined set point; transmission of the RF signal actuates a warning for the vehicle driver. However, the system does not have any mechanism to automatically replenish the low tire pressure.

SUMMARY OF THE INVENTION

The present invention seeks to provide a new self-regulating tire pressure system and method that senses a low pressure condition within a tire, automatically replenishes the pressure to a desired level, is less complex and expensive than prior approaches, provides the vehicle operator with information on the cause of the low pressure condition and whether tire repair or replacement is required, and does not require the intervention of the vehicle operator to restore tire pressure.

These goals are accomplished with the use of a bistable valve that opens an air flow between the high pressure reservoir and the tire when the tire pressure falls below a predetermined actuating level, and halts the air flow when the tire pressure has increased to a closing pressure that is greater than its actuating pressure. The valve condition is communicated to the vehicle by means of a primary winding on the vehicle chassis adjacent the wheel, and a secondary winding on the wheel that is connected along with a set of valve contacts in a secondary circuit. The valve contacts open and close as the valve switches between its two stable positions, producing a change in the impedance of the secondary circuit that is reflected back to the primary winding. The reflected impedance provide an indication of the valve operations.

A logic circuit supplied by the primary winding differentiates between various low pressure tire conditions. If the frequency of valve operation exceeds a predetermined threshold, a slow leak as opposed to a normal pressure loss through the tire wall is indicated. When the duration of the valve operation exceeds a predetermined threshold, a low reservoir air pressure condition is indicated. When the number of valve operations that last for a predetermined duration exceeds a predetermined threshold, a flat tire situation is indicated.

The valve preferably incorporates a bistable diaphragm that moves between two stable positions respectively opening and closing the air flow passageway from the high pressure reservoir. In one embodiment the diaphragm comprises a flexible membrane that carries a first magnetic member aligned with a stationary magnetic member. At least one of the magnetic members is magnetized to hold the two members together with the diaphragm closing the air flow passageway from the high pressure reservoir when the tire pressure exceeds the valve closing pressure; the diaphragm flexes away from the second magnetic member to its other stable position and opens the air flow passageway when the tire pressure falls below the valve actuating pressure. In a second embodiment the bistable diaphragm is a prestressed metal diaphragm that is oriented about a central plane and has stable positions on opposite sides of that plane. The metal diaphragm may be lodged in a recess that allows a restricted movement of the diaphragm when it moves between its bistable positions, thus enhancing the diaphragm's snap action. In this embodiment an air impermeable flexible diaphragm may be connected to move with the metal diaphragm, and spans the housing in which the recess is formed to block the flow of air therethrough.

The valve compares the tire pressure with a reference pressure that can be provided from sources such as a pressure regulator, a spring or a sealed bellows. A flow of air from the high pressure reservoir to the tire is actuated when the differential between the compared pressures exceeds a threshold amount.

Further features and advantages of the invention will be apparent to those skilled in the art from the following detailed description, taken together with the accompanying drawings, in which:

DETAILED DESCRIPTION OF THE INVENTION

Figure 1:
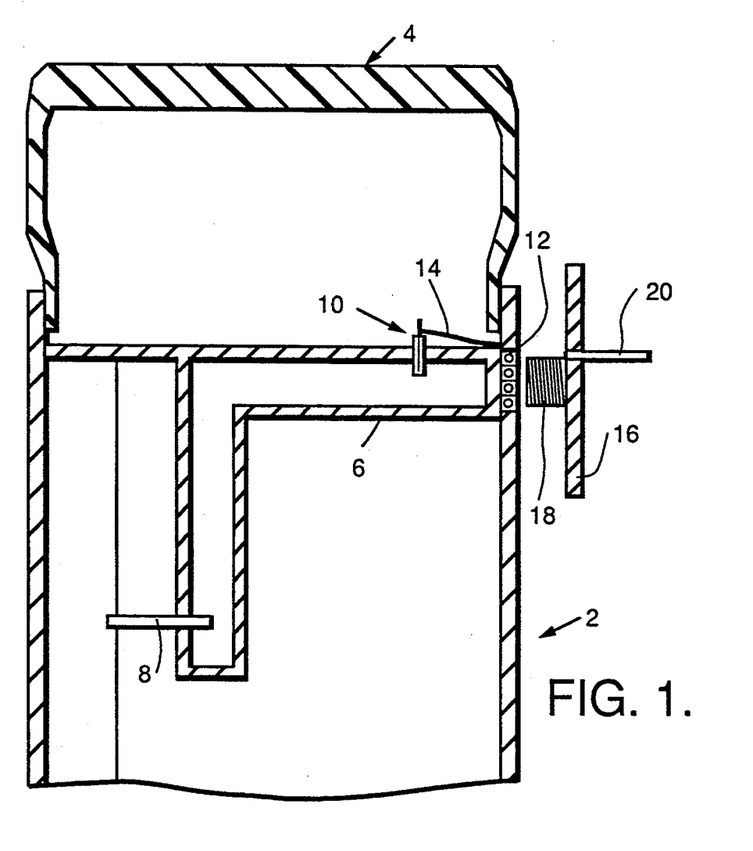
FIG. 1 is a sectional view of a portion of a vehicle tire and wheel illustrating the basic mechanical elements of one embodiment of the invention.

Referring first to FIG. 1, the relevant elements of a vehicle wheel 2 with a tire 4 seated thereon are illustrated. The wheel 2 includes a built-in high pressure reservoir 6, with a valve stem 8 extending into the reservoir so that it can be replenished with pressurized air. The system is preferably designed to operate with a reservoir pressure of over 100 psi, which is commonly available at most filling stations; 150 psi is preferred.

A valve 10 provides an air passageway between the high pressure reservoir 6 and the interior of the tire 4. In accordance with the invention, the valve 10 has a bistable construction such that it opens the passageway between the high pressure reservoir and tire when the tire pressure has dropped below a predetermined threshold level, allowing air from the reservoir to flow into the tire and restore its pressure. The valve does not close off the passageway until the pressure within the tire has reached an elevated level that exceeds the original actuating pressure. For example, the valve may automatically actuate when the tire pressure falls below about 34 psi, but not reset until the tire pressure has reached a higher level such as 35 psi.

The opened/closed status of the valve 10 is communicated to the vehicle by means of a coil of wire 12 installed on the outer periphery of the wheel. A set of contacts within the valve 10 open when the valve is in one state and close when the valve is in its other state, and are connected in series with the winding 12 via a pair of wires 14. The overall winding circuit is open when the valve contacts are open, and closed when the contacts are closed.

Mounted on the wheel well 16 of the vehicle chassis approximately one-quarter inch from the wheel windings 12 is a primary winding coil 18 that senses the reflected impedance of the secondary winding circuit 12, and thus determined whether the valve 10 is open or closed. The primary and secondary windings 18 and 12 preferably comprise 40 turns of 20 guage and 6 turns of 17 gauge solid copper magnet wire, respectively. A pair of lead wires 20 provide the input to primary winding 18, and also couple the reflected impedance signal from the primary winding 18 to logic circuitry described below. Similar connections are made to the primary windings which communicate with secondary windings on each wheel separately, so that the status of each tire can be displayed to the operator separately.

Figure 2:
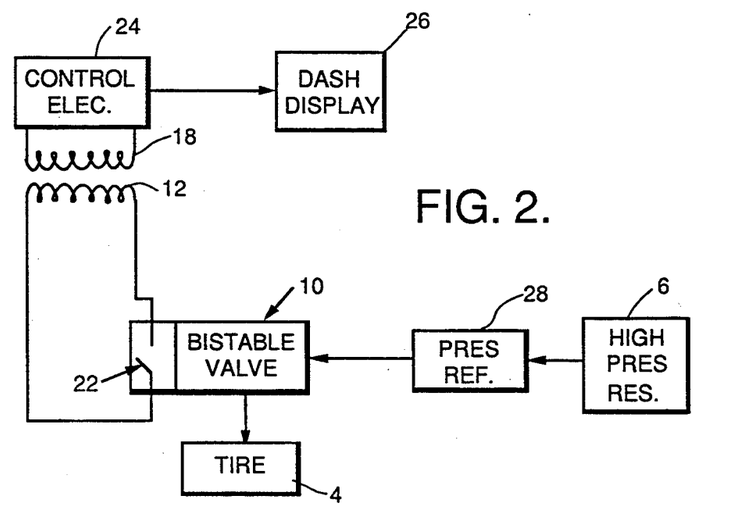
FIG. 2 is a block diagram of the invention.
Figure 3:
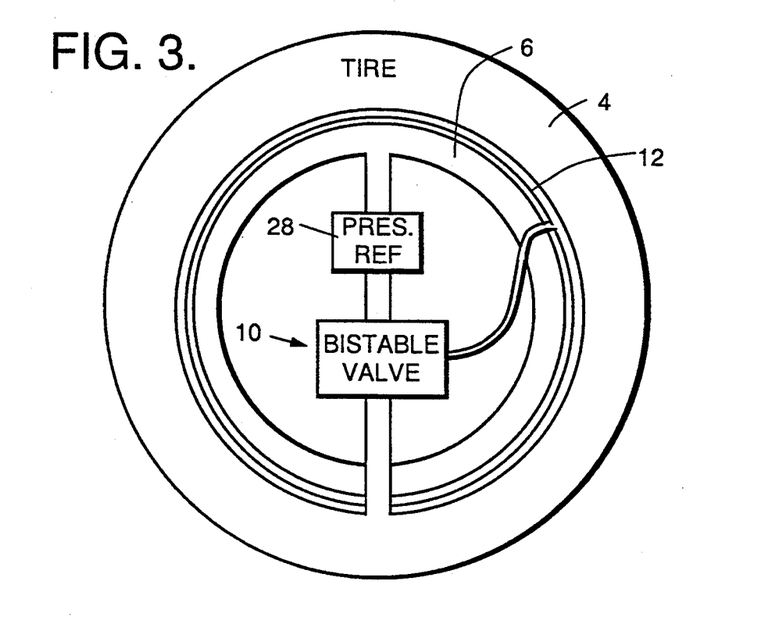
FIG. 3 is a diagram of a tire and wheel illustrating their interconnection through the bistable valve used in the invention.

FIGS. 2 and 3 show additional aspects of the overall system. The secondary winding 12 is shown connected in series with pair of switch contacts 22 that are operated by the bistable valve 10, while the primary winding 18 provides a signal to the system's control electronics 24 to indicate the valve's status. The control electronics sense the frequency and duration of the valve operations, interpret this data to determine the nature of a low pressure condition, and actuate the vehicle dashboard display 26 to notify the vehicle operator of the nature of a problem with any of the tires, and the identity of the affected tire.

The high pressure reservoir 6 supplies a reference pressure source 28 such as a pressure regulator; a sealed bellows or a spring can also be used to establish the reference pressure. The reference pressure source 28 normally has a single set point at which it tries to maintain pressure. With the addition of the bistable valve 10, a second and lower set point determined by the valve is added. For example, assume that for an automobile tire it is desired to begin replenishing the tire pressure when it drops below 34 psi, and to continue increasing the tire pressure until it reaches 35 psi. In this situation the reference pressure source 28 does not begin correcting the tire inflation until the lower set point (34 psi) is reached. At that time the valve is actuated and allows high pressure air from reservoir 6 to replenish the tire pressure. When the tire pressure has been restored back to its normal set point (such as 35 psi) the valve connection automatically closes, thereby discontinuing further filling of the tire. The reference pressure provided to the valve for a 150 psi high pressure reservoir 6 may be about 36 psi, for example.

Figure 4:
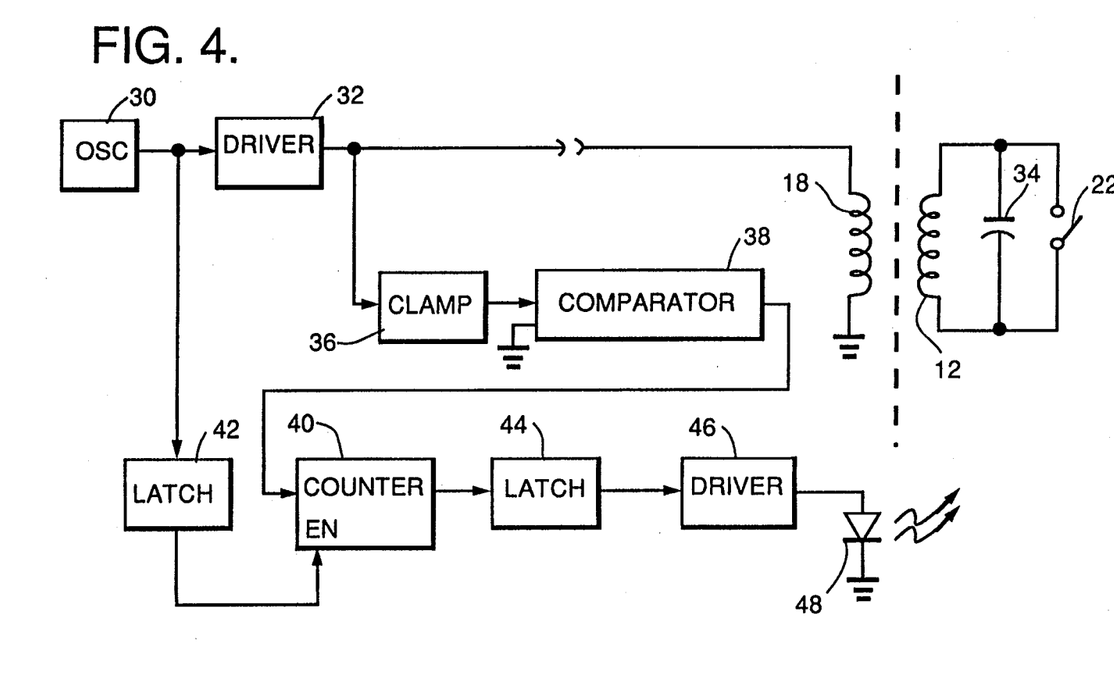
FIG. 4 is a block diagram showing the communication between the vehicle and wheel to detect when the valve has operated.

A block diagram of circuitry that is suitable for indicating the valve's status, and thus whether a leak in the tire is present, is given in FIG. 4. A low duty cycle waveform, preferably with a duty cycle substantially less than 50%, is generated by an oscillator 30. The waveform is preferably generated as a series of pulses at a frequency of a few Hz to about 20 Hz for low power applications, with a pulse duration of about 20–25 microseconds. The pulses operate a circuit driver 32, preferably implemented as a PNP darlington transistor. The output pulses from driver 32 are fed through the primary winding 18 on the vehicle chassis, and are coupled thereby to the secondary winding 12.

The impedance of the secondary circuit that includes secondary winding 12 is reflected back to the primary winding 18 to provide an indication of whether the valve contacts 22 are open or closed, and thus whether the valve is operating to restore the tire pressure or is quiescent. The reflected impedance appears as a small load when the contacts are open, and as a high load when the contacts are closed. This can be implemented in several ways. One method is to provide constant current pulses to the primary and look for a reduction in secondary voltage when the contacts are closed. Another method is to provide constant voltage primary pulses and look for an increase in secondary current as an indication of closed contacts. A third method is to connect a capacitor 34 in parallel with the secondary winding 12 and contacts 22. The capacitor 34 together with the inductance of secondary winding 12 forms a tuned circuit that oscillates at a resonant frequency when the contacts 22 are open, but is short-circuited when the contacts 22 are closed. An open contact condition, reflecting an operation of the valve, produces a "ringing" or resonant oscillation when the core of the primary winding 18 has become saturated and the input pulse turns off.

The waveform reflected back to the primary winding 18 is fed through a clamping circuit 36 to a zero crossing comparator circuit 38. The comparator circuit responds to ringing signal by squaring up its edges and presenting a series of pulses to a counter 40, the operation of which is enabled when the oscillator 30 is operating by means of a latch circuit 42 fed from the oscillator. The counter 40 functions as a hardware filter, requiring a fixed number of pulses from the comparator 38 before it produces an output. For the primary/secondary circuits and drive signal described above, five input pulses could be required to produce an output from counter 40. This output triggers a one-shot latch 44 that operates a driver 46 to turn on a low tire pressure indicator such as light emitting diode 48 on the vehicle's display panel.

The circuitry of FIG. 4 simply indicates that the bistable pressure valve has operated, without identifying the tire condition that caused the valve operation. A logic circuit that responds to the signal reflected from the secondary winding circuit back to the primary winding by distinguishing between different low pressure conditions is shown FIG. 5. It utilizes a clock 50 that generates pulses at a desired rate, such as 1 Hz. The status of the bistable valve, as indicated by the impedance reflected back to primary winding 18, is fed from an input line 51 into a two-bit counter 52 that operates by producing a Q1 output over output line 54 the first time the valve operates, and both Q1 and Q2 outputs respectively over output lines 54 and 56 the second time the valve operates.

Figure 5:
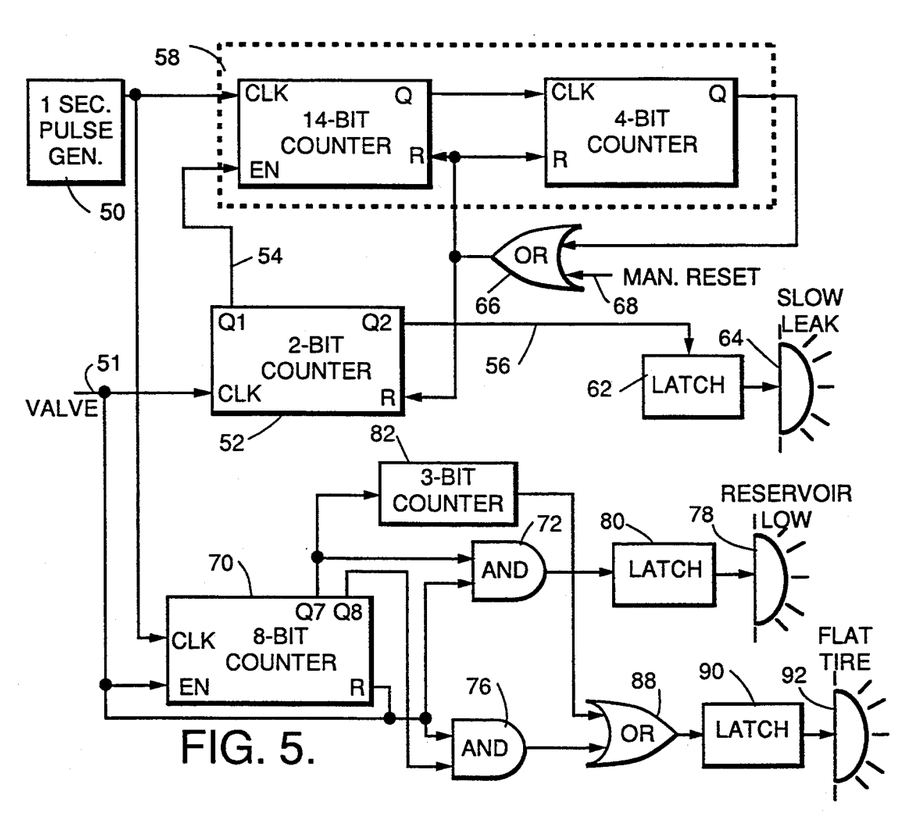
FIG. 5 is a logic diagram of the logic circuitry used to distinguish between various types of tire leak and low reservoir conditions.

The output of clock 50 and the Q1 output of the two-bit counter 52 are connected respectively to the clock and enable inputs of a timing circuit 58. The timing circuit determines the time interval between two successive valve operations. If this interval is less than a predetermined threshold duration, a slow leak as opposed to a normal long term loss of tire pressure is indicated. For example, the timing circuit 58 is shown implemented as an 18-bit counter which produces an output after running for 262,144 seconds, or approximately 3 days (the 18-bit counter is fabricated by connecting readily available 14-bit and 4-bit counters in series). A Q (high) output is produced by counter 58 when it has counted up to its limit.

The Q2 output of 2-bit counter 52 is connected to a latch 62 that operates a "slow leak" lamp 64 on the vehicle's dashboard panel. The Q output of the timing circuit counter 58 is connected through an OR gate 66 to reset both of the counters 52 and 58; a manual counter reset is also provided through OR gate 66.

The operation of the FIG. 5 circuit in producing a slow leak warning will now be described. Assume first that a slow leak is present, causing successive valve signals to be generated at intervals of less than 3 days. The first valve signal causes 2-bit counter 52 to enable the operation of timing circuit counter 58, which begins to count up. The second valve signal appears before counter 58 has reached its limit. This second signal activates both the Q1 and Q2 outputs of 2-bit counter 52, which respectively continue the enablement of timing circuit counter 58 and provide an input to latch 62, causing the "slow leak" lamp 64 to illuminate.

Assume next that a second valve operation is not detected before the timing circuit counter 58 has reached its limit. In this situation the Q2 input to latch 62 remains low while the timing circuit counter 58 counts all the way up to its limit, preventing the "slow leak" lamp 64 from lighting. A Q output is produced by timing circuit counter 58 when it reaches its limit, causing both the counter 58 and the 2-bit counter 52 to reset. The next valve signal to be received will thus appear as an initial signal that enables a restart of the logic circuit operation, with the "slow leak" lamp 64 continuing to be held off unless an additional valve signal is subsequently received before the timing circuit counter 58 has counted out.

While the circuit described thus far in connection with FIG. 5 has been referred to as a "slow leak" circuit, it does not distinguish between a slow leak and a fast leak or flat tire situation. A fast leak can be detected with a similar logic circuit that uses a lower capacity timing circuit counter, for example an 8-bit counter that lights a "fast leak" indicator for successive valve operations in less than 4 minutes. Operation of the "fast leak" detection circuit can be used to lock out the "slow leak" detector for that tire. Alternately, the manual reset input 68 to OR gate 66 can be used to distinguish a fast from a slow leak. If the operator observes the "slow leak" lamp, he or she can operate the manual reset to extinguish the lamp. If it comes on again in a short period of time, a fast leak is indicated.

Several different tire and high pressure reservoir conditions can be detected by observing the duration of the valve operations, a capability that is provided by the present bistable valve approach. To determine the duration of valve operations, a counter such as 8-bit counter 70 receives a clock signal from the 1 Hz clock 50, and both enable and reset signals from the valve input line 51. This configuration causes the counter 70 to count up when both clock and enable signals are present, and to immediately reset when the enable signal is removed. Counter 70 determines the duration of each valve operation. Its seventh and eighth output bits, respectively Q7 and Q8, are connected as inputs to AND gates 72 and 76, respectively. The valve signal line 51 is connected as a second input to both of these AND gates. Thus, AND gate 72 will produce an output when the Q7 output of output of counter 70 goes high and a valve signal is present, and AND gate 76 will produce an output when the Q8 output is high and the valve signal is still present. The Q7 and Q8 counter outputs correspond to valve operations of 128 and 256 seconds, respectively.

Figure 6:
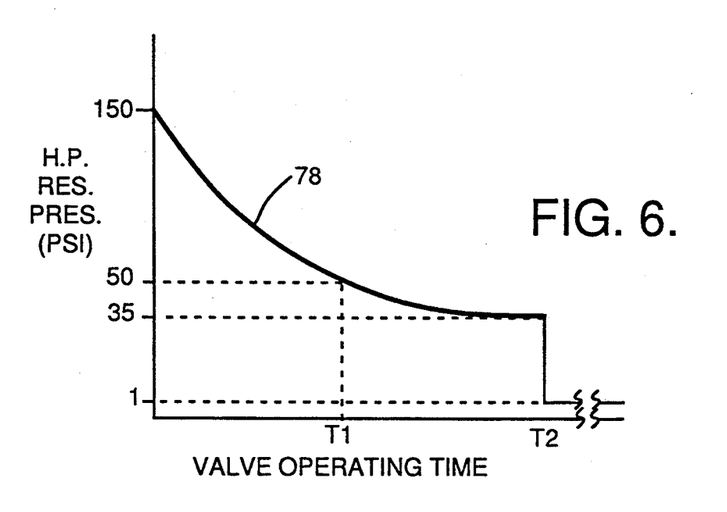
FIG. 6 is a graph comparing the pressure in the high pressure reservoir with the time required to restore the tire pressure when a pressure regulator is used to provide a reference pressure for the valve.

A representative relationship between the air pressure within the high pressure reservoir and the duration of the valve operation, when a regulated reference pressure is compared with the tire pressure to actuate a flow of air from the reservoir to the tire, is illustrated in FIG. 6. Since air is bled from the high pressure reservoir during each valve operation, its pressure will progressively decrease for multiple valve operations, or if one valve operation lasts for an extended period of time. The reduction in reservoir pressure as a function of the aggregate time the valve has operated, either as a result of multiple operations or from a single extended operation, is indicated by curve 78. The rate of pressure reduction in the reservoir is a function of the initial reservoir pressure, the valve set point pressures, and the relative volumes of the reservoir and tire. To provide the operator with an indication that the pressure within the reservoir has been reduced to a point at which it should be replenished, a "reservoir low" warning can be provided at a somewhat arbitrary selected pressure, such as 50 psi. In addition, extended mobility tires are presently contemplated that can continue to be operated for up to several hundred miles after a flat has been incurred; a warning can also be provided if this occurs.

These various situations are indicated in FIG. 6. When the reservoir reaches an undesirably low pressure, such as 50 psi, the valve operating time necessary to replenish the tire pressure increases to T1. For a flat in an extended mobility tire the valve will repeatedly operate, with the tire gradually losing pressure and the reservoir being further depleted with each operation; the duration of each operation will remain relatively constant at T2, until a pressure of about 1 psi is reached (when a 1 psi pressure differential is used to actuate the valve). Thereafter the valve will remain open with little or no further replenishment of tire pressure.

Referring back to FIG. 5, a "reservoir low" situation is displayed by a lamp 78 that is actuated by a latch 80 when both the Q7 and the valve signals are presented to AND gate 72. To display a flat tire warning, a 3-bit counter 82 connected to the Q7 output of 8-bit counter 70 produces an output when counter 70 has counted up to Q7 (128 seconds) eight separate times. This corresponds to eight valve operations of duration T1 (FIG. 6), indicating that the tire pressure has fallen to less than 20 psi. The output of 3-bit counter 82 is delivered through an OR gate 88 to a latch 90 that lights a "flat tire" lamp 92. The flat tire lamp 92 is also illuminated by a single occurence of the Q8 (256 seconds) output of counter 70, processed through AND gate 76 and OR gate 88. Even if the 3-bit counter 82 has not yet lit the flat tire lamp 92, the occurrence of a valve operation for 256 seconds or more can be taken as an indication of a flat tire.

Only a few indicators that may be obtained from the information regarding valve operating frequency and operating duration have been described. Numerous other warning indicators that take advantage of the bistable valve employed by the invention may also be envisioned. It should also be realized that the assignment of specific times such as 128, 256 or 512 seconds to identify particular situations is somewhat arbitrary, and can be adjusted as necessary to meet the needs of any particular tire/wheel system.

Figure 7:
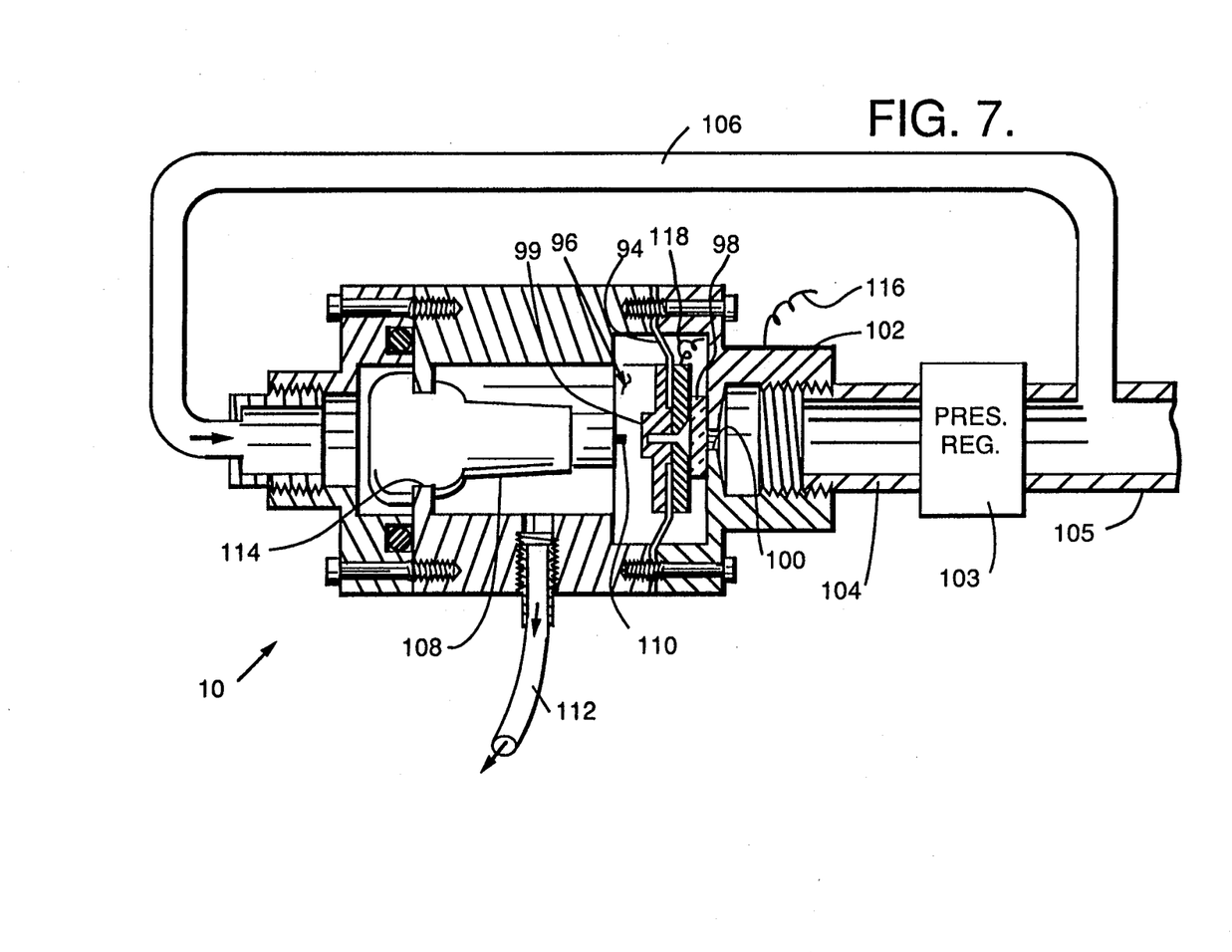
FIG. 7 is a sectional view of a bistable valve construction that employs a pressure regulator.

One implementation of a suitable bistable valve 10 is shown in FIG. 7. A flexible diaphragm 94 spans a compartment 96 within the valve housing, segregating the pressure on one side of the diaphragm from that on the other side. A permanent magnet 98 is affixed to a striker 99 clamped to the center of the diaphragm, and is aligned with a bore 100 formed in a valve end piece 102 of magnetic material. A regulated pressure of say 36 psi is supplied from a pressure regulator 103 to the end piece 102 through a conduit 104. The pressure regulator 103 is supplied with air from the high pressure reservoir via a conduit 105, with a branch conduit 106 supplying the same reservoir pressure to the opposite end of the valve housing. A valve stem 108 on the opposite side of diaphragm 94 from the end piece 102 receives the reservoir pressure from conduit 106 on one side, and on its opposite side has an actuating tip 110 that is aligned with the diaphragm striker 99 within compartment 96. The compartment 96 is vented to the tire through an outlet 112, and is segregated from the reservoir pressure of conduit 106 by a flange 114 that retains the valve stem 108 in place.

The diaphragm 94 thus receives the regulated pressure on its right hand side, and the tire pressure on its left hand side. The diaphragm, magnet 98 and valve end piece 102 are selected so that the magnet remains seated against the end piece 102 for a tire pressures greater than the desired valve actuating pressure. This establishes one of the valve's two stable conditions. When the tire pressure falls below the actuating threshold, say 34 psi, the increased pressure differential across the diaphragm causes it to flex and begin to lift the magnet 98 away from the valve end piece 102. The magnet's movement away from the valve end piece in turn reduces the magnetic force of attraction between these two elements, thus accelerating the movement of the diaphragm to the left. As the diaphragm continues to travel to the left, but before it reaches it center position, it pushes against the valve stem's actuating tip 110, opening an air passageway through the valve stem that allows reservoir air from conduit 106 to flow through the valve stem and outlet 112 to the tire. The valve stem remains open until the tire pressure has increased to the valve's second set point, for example 35 psi. At this point the pressure differential across the diaphragm is reduced to 1 psi, and the residual magnetic force between the permanent magnet 98 and the magnetic end piece 102 causes the diaphragm to lift off the actuating tip 110, terminating the flow of air into the tire. Since the diaphragm is now moving towards the end piece 102 the magnetic attraction between magnet 98 and the end piece increases, causing the diaphragm to snap over to the right to a stable off position with the magnet clamped to the end piece 102.

The valve is thus truly bistable, with only two stable positions. In one position the valve is fully off, with the magnet 98 clamped against the end piece 102. In the other stable position the valve is fully open, with the striker 99 depressing the valve stem actuating tip 110.

The metallic end piece 102 and the magnet 98 form the contacts 22 that were described in connection with FIGS. 2 and 4, and that are connected in the secondary circuit to indicate whether the valve is open or closed. Electrical lead wires 116 and 118 are connected respectively to the end piece 102 and to the metallic striker 99 for this purpose. When the magnet 98 is clamped against the end piece 102 in the position shown in FIG. 7, the contacts are closed and the capacitor 34 of FIG. 4 is short-circuited, thus preventing a ringing in the secondary circuit and providing an indication that the valve is off. When the diaphragm has flexed to the left and is depressing the valve stem actuating tip 110, the magnet 98 is electrically isolated from the end piece 102; this opens the contacts 22 of FIG. 4 and produces a resonant LC secondary circuit that indicates the valve is operating.

Figure 8:
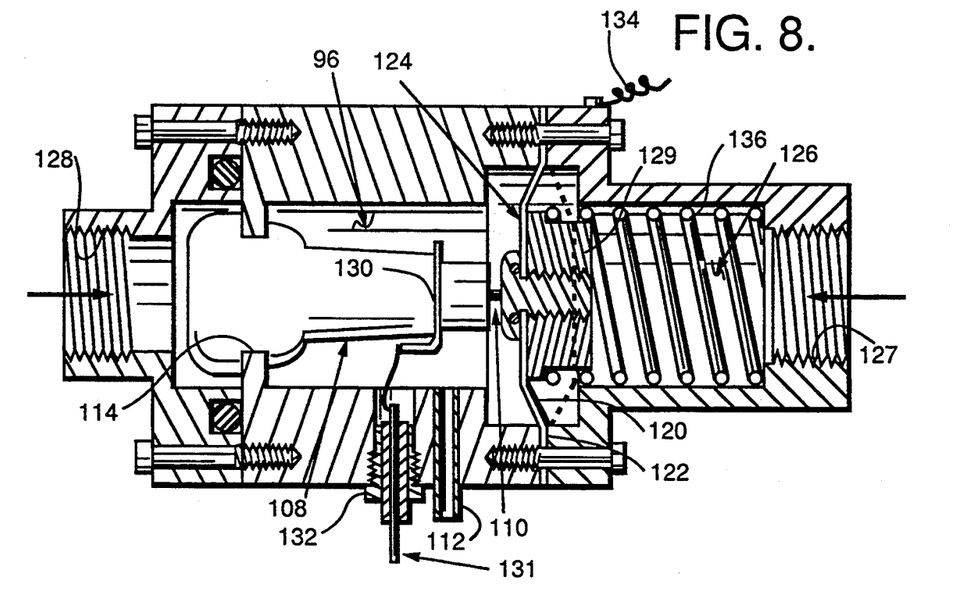
FIG. 8 is a sectional view of a bistable valve construction that employs both a pressure regulator and a spring as a combined reference pressure source.

It is important that the valve have no stable position other than fully open or fully closed, so that it will not continuously supply a small steady air flow to a slow leak without cycling. Another valve arrangement that can also be used for this purpose is illustrated in FIG. 8. Several elements of this embodiment are the same as for the valve of FIG. 7, and are identified by the same reference numerals. In the embodiment of FIG. 8 a prestressed metal diaphragm 120 has a peripheral lip 122 that is clamped to the valve housing so that the diaphragm spans the interior of the housing. An air impermeable flexible diaphragm 124 spans the housing adjacent to the metal diaphragm 120, with its periphery clamped in place so that air cannot flow from one side of the rubber diaphragm to the other. The tire pressure is introduced into the compartment 96 on the valve side of the air impermeable diaphragm 124, while regulated pressure from the pressure regulator (not shown) is introduced into a spring compartment 126 on the opposite side of the metal diaphragm 120 through an inlet port 127, and high pressure air from the reservoir is introduced to a high pressure area 128 at the valve inlet. A metallic connector 129 clamps the middle sections of the two diaphragms and forces them to flex together. An electrical connection is made to the valve stem tip 110 through the valve stem 108 via a metal collar 130 around the valve stem and a lead wire 131 that extends through a feed-through bushing 132 in the housing wall. An electrical connection is made to the metal diaphragm 120 with a lead wire 134 that connects to the valve housing at any convenient location. Lead wires 131 and 134 are connected in series with the secondary winding on the wheel.

A coil spring 136 is lodged within the spring compartment 126 between a lip on the metallic connector 129 and the opposite end of the spring compartment 126. The spring 136 provides a reference pressure that opposes the tire pressure on the opposite side of the diaphragms 120 and 124 to control the valve operation. While the spring 136 might be used as the sole source of reference pressure, the spring force tends be unevenly distributed across the metal diaphragm 120, and the magnitude of the spring force varies with the diaphragm position. These drawbacks are mitigated with the addition of the regulated air pressure within the spring compartment 126, which supplies an evenly distributed pressure to the diaphragm that does not vary with the diaphragm position. When the regulated pressure is used together with the spring to provide a reference pressure the spring pressure may be correspondingly reduced, such as to about 20 psi.

In the position shown in FIG. 8, the dome of the prestressed metal diaphragm 120 is flexed to the left to depress the valve stem tip 110 and actuate the valve stem. High pressure air thus flows into the tire until the tire pressure has increased to the desired second set point, at which time the reduced pressure differential across the diaphragm causes it to snap to its second stable position (indicated by a dashed line), with its dome flexed to the right away from the valve stem. The two lead wires 131 and 134 are electrically connected when the diaphragm 120 is flexed leftward to actuate the valve, and electrically separated when the diaphragm is flexed rightward to shut the valve off. The making and breaking of these contacts provides an indication of the valve status, in a manner similar to (but out of phase with) the contacts of FIG. 7.

The prestressed metal diaphragm 120 has only 2 stable positions, with its dome flexed either left or right as indicated in FIG. 8. The metal diaphragm is preferably formed from 0.005 inch thick stainless steel, 1.25 inch in diameter with a 0.04 inch high dome.

Figure 9:
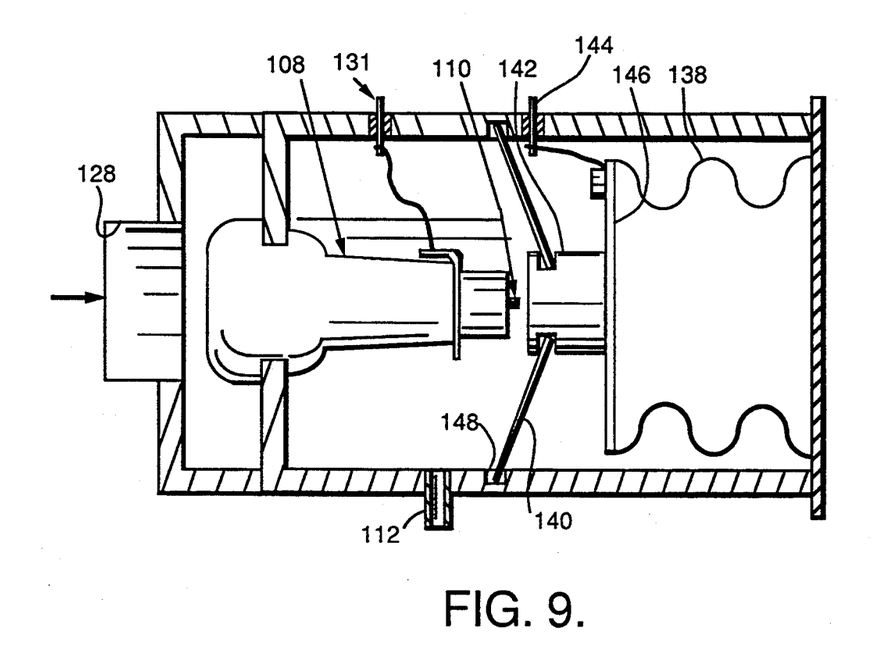
FIG. 9 is a sectional view of an alternate bistable valve construction that employs a sealed bellows as a reference pressure source.

Another valve embodiment that employs a different source of reference pressure is illustrated in FIG. 9. In this embodiment a sealed bellows 138 is filled to the desired reference pressure, such as 36 psi. A bistable metal diaphragm 140 similar to the diaphragm 120 of FIG. 8 has its center connected to move with the bellows 138 between valve actuating and valve non-actuating positions. As shown in FIG. 9, the diaphragm 140 has a central opening that is mounted on a striker 142 affixed to the bellows. When flexed to the right as shown, the valve stem 108 is not actuated. When the tire pressure outside the bellows drops below the valve actuating point, the reference pressure within the bellows causes the diaphragm to snap to the left, depressing valve stem tip 110 to actuate the valve. This permits high pressure reservoir air from the left side of the valve stem 108 to flow through the valve and out to the tire. The position of the valve is monitored by the lead wire 131 connected to the valve stem tip 110 as in FIG. 8, and by a second lead wire 144 that is either connected to the striker 142 through a metallic bellows end plate 146, or through the metallic diaphragm 140 in the valve housing if a good electrical connection is maintained between these two parts.

The prestressed metal diaphragm 140 is similar to the diaphragm 120 of FIG. 8, but it is shown lodged within an inner peripheral recess 148 formed in the wall of the valve housing. The diaphragm thickness is less than the width of the recess, allowing the diaphragm to "float" axially within the recess. This adds to the diaphragm's snap action when it moves from one of its stable positions to the other.

Figure 10:
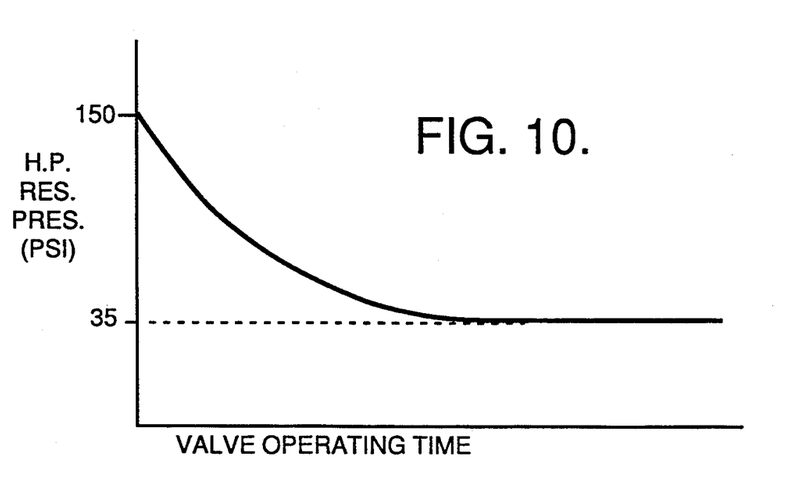
FIG. 10 is a graph comparing the pressure in the high pressure reservoir with the time required to restore the tire pressure when a pressure regulator is not employed.

A generalized curve that relates the pressure in the high pressure reservoir to the valve operating time required to replenish the tire pressure, for a valve in which a sealed bellows or a spring but not a regulated pressure is used as a reference for the tire pressure, is illustrated in FIG. 10. Since the pressure supplied by a sealed bellows or spring reference will not fall below its predetermined set point, even when the pressure in the high pressure reservoir falls below that set point as a result of repeated valve operation, the valve will be permanently actuated once the high pressure reservoir falls to the pressure set point for resetting the valve after an operation. This is indicated in FIG. 10 by a flattening of the curve so that it becomes horizontal once the illustrative set point of 35 psi is reached. Even though the reservoir pressure will fall below 35 psi if the tire continues to leak, the reference pressure will remain at its preset level, such as 36 psi. For this type of valve the flat tire warning logic of FIG. 5 will not be applicable, although the other warnings shown in FIG. 5 can still be provided.

Figure 11:
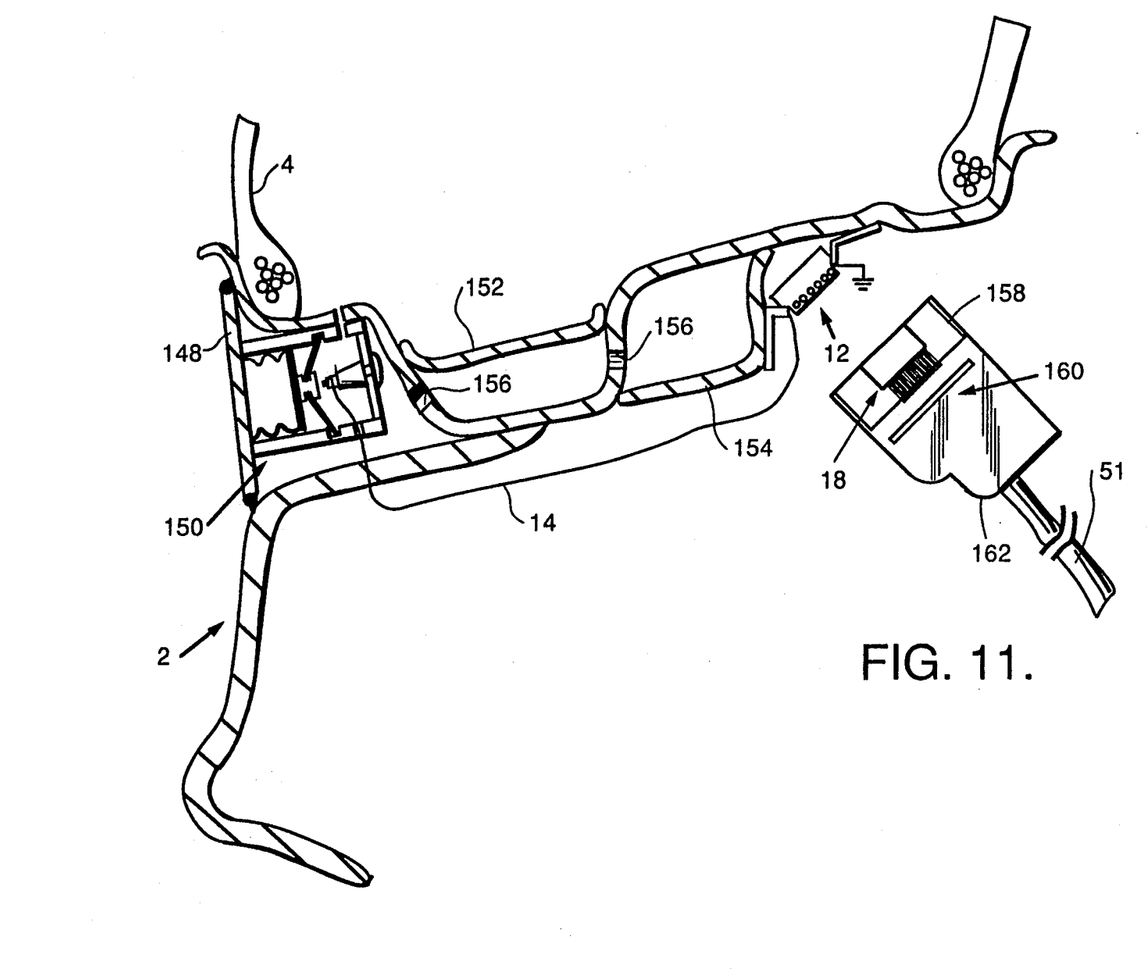
FIG. 11 is a fragmentary sectional view of a valve and high pressure reservoir incorporated into a conventional wheel.

FIG. 11 shows the valve of FIG. 9 incorporated into a wheel 2. A mounting plate 148 is welded across two existing sections of the wheel rim, with the valve 150 carried by the mounting plate within a space between the two wheel sections. Additional plates 152 and 154 are welded across contours around the periphery of the wheel to form reservoir sections that are interconnected by drilled openings 156. The secondary winding 12 is shown wound around a core 158, with the processing electronics mounted on a substrate 160 inside a molded polyurethane housing 162. The invention can thus be incorporated into a standard wheel, although customized wheels may also be provided.

A tire pressure regulating system and operating method that provides detailed information on the exact condition of the tire, and is both simple and inexpensive in construction, is made possible with the invention. While several illustrious embodiments of the invention have been shown and described, numerous variations and alternate embodiments will occur to those skilled in the art. For example, the valves described herein will have applications outside of tire pressure regulation, and the secondary winding contacts can be operated normally closed rather than normally open. Such variations and alternate embodiments are contemplated, and can be made without departing from the spirit and scope of the invention as defined in the appended claims.

We claim:

1. A self-regulating tire pressure system, comprising:
   a wheel for seating a tire, said wheel including a reservoir for providing a high pressure air source,
   a valve for establishing an air flow communication between said reservoir and a tire seated on said wheel in response to a low air pressure condition in the tire that is caused by either a slow leak or a fast leak,
   sensing means responsive to operations of said valve for generating a signal indicative of low pressure condition, and
   indicator means responsive to said signal for generating mutually distinct indications of a slow leak or a fast leak.

2. The self-regulating tire pressure system of claim 1, said sensing means comprising means for sensing said valve's frequency of operation, said indicator means including means for indicating a slow tire leak when said frequency exceeds a predetermined threshold.

3. The self-regulating tire pressure system of claim 1, said sensing means comprising means for sensing the number of valve operations and the duration of each such operation, said indicator means including means for indicating a flat tire condition when the number of said operations of a predetermined duration exceeds a predetermined threshold.

4. The self-regulating tire pressure system of claim 1, said sensing means comprising means for sensing the duration of said valve's operation, said indicator means including means for indicating a low reservoir air pressure condition when said duration exceeds a predetermined threshold.

5. The self-regulating tire pressure system of claim 1, for a vehicle having said wheel mounted with respect to a vehicle chassis, said sensing means comprising a primary electrical winding on said chassis proximate to said wheel, means for delivering an alternating electrical signal to said primary winding to establish a primary winding flux field, a secondary winding on said wheel within said primary winding flux field, a valve indicator means connected in circuit with said secondary winding for changing the secondary winding impedance reflected back to said primary winding according to whether or not said valve is establishing said air flow communication, and timing means responsive to said reflected secondary winding impedance for timing operations of said valve.

6. The self-regulating tire pressure system of claim 5, wherein said means for delivering an alternating electrical signal to said primary winding delivers a pulsed signal with substantially constant current pulses, and said timing means is responsive to the voltage across said primary winding.

7. The self-regulating tire pressure system of claim 5, wherein said means for delivering an alternating electrical signal to said primary winding delivers a pulsed signal with substantially constant voltage pulses, and said timing means is responsive to the current through said primary winding.

8. The self-regulating tire pressure system of claim 5, wherein said secondary winding and valve indicator means comprise a tuned circuit with respect to the alternating electrical signal on said primary winding when said valve is establishing said air flow communication, and said timing means is responsive to a tuned resonance between said primary and secondary windings.

9. The self-regulating tire pressure system of claim 5, said means for delivering an alternating signal to said primary winding delivering a signal with a duty cycle substantially less than 50%.

10. The tire pressure system of claim 1 wherein said indicator means comprises a logic circuit for detecting frequency of operation of said valve.

11. The tire pressure system of claim 10 wherein said logic circuit includes means for detecting duration of operation of said valve.

12. A self-regulating tire pressure system, comprising:
    a wheel for seating a tire, said wheel including a reservoir for providing a high pressure air source,
    a valve for establishing an air flow communication between said reservoir and a tire seated on said wheel in response to a low air pressure condition in the tire that is caused by either a slow leak or a fast leak,
    sensing means responsive to operation of said valve for generating a signal indicative of frequency and duration of valve operation, and
    logic means responsive to said signal for providing a first indication of a slow leak condition, a second indication of a fast leak condition, and a third indication of a low pressure in said reservoir.

13. The self-regulating tire pressure system of claim 12 wherein said logic means includes means for providing said first indication when said signal is repeated within a first time interval of a predetermined length, and means for providing said second indication when said signal is repeated within a second time interval having a length that is smaller than said predetermined length of said first time interval.

14. The self-regulating tire pressure system of claim 13 wherein said logic means includes means for providing said third indication when duration of said valve operation exceeds a predetermined time.

* * * * *